US012806528B2

(12) United States Patent
Nakada et al.

(10) Patent No.: US 12,806,528 B2
(45) Date of Patent: Nov. 24, 2026

(54) NON-TRANSITORY STORAGE MEDIUM HAVING STORED THEREIN INFORMATION PROCESSING PROGRAM, INFORMATION PROCESSING APPARATUS, INFORMATION PROCESSING METHOD, AND INFORMATION PROCESSING SYSTEM FOR GENERATING A VIRTUAL TERRAIN

(71) Applicant: Nintendo Co., Ltd., Kyoto (JP)

(72) Inventors: Ryuichi Nakada, Kyoto (JP); Akira Kinashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 273 days.

(21) Appl. No.: 18/647,628

(22) Filed: Apr. 26, 2024

(65) Prior Publication Data

US 2025/0001304 A1 Jan. 2, 2025

(30) Foreign Application Priority Data

Jun. 30, 2023 (JP) ................................ 2023-107743

(51) Int. Cl.
*A63F 13/60* (2014.01)
*G06T 17/05* (2011.01)

(52) U.S. Cl.
CPC .............. *A63F 13/60* (2014.09); *G06T 17/05* (2013.01); *A63F 2300/66* (2013.01)

(58) Field of Classification Search
CPC .......... G06T 17/05; A63F 13/00; A63F 13/60; A63F 2300/66
USPC .......................................................... 345/419
See application file for complete search history.

(56) References Cited

U.S. PATENT DOCUMENTS

2006/0030405 A1* 2/2006 Robertson ............... A63F 13/52 463/30
2017/0046882 A1* 2/2017 Lane ....................... A63F 13/23
2020/0129862 A1* 4/2020 Liu ......................... G06T 17/10
2022/0040583 A1 2/2022 Li et al.
2023/0149812 A1* 5/2023 Hooker .................. A63F 13/52 463/31
2024/0070981 A1* 2/2024 Canelhas ................ G06T 19/20

FOREIGN PATENT DOCUMENTS

CN 112530012 A 3/2021
JP 2008500637 A 1/2008
JP 2017097568 A 6/2017
(Continued)

*Primary Examiner* — Jacinta M Crawford
(74) *Attorney, Agent, or Firm* — Scully, Scott, Murphy & Presser, P.C.

(57) ABSTRACT

An information processing program for generating virtual terrain causes a computer to function as: a terrain object allocating unit 42, which allocates a terrain object automatically selected from a plurality of terrain object candidates as a selected terrain object to each of a plurality of areas segmented in a planar direction in a three-dimensional virtual space; a height parameter determining unit 43 that automatically determines a height parameter indicating a position in the height direction in the three-dimensional virtual space for each of the plurality of selected terrain objects; and a terrain generation unit 45 that generates virtual terrain that includes the selected terrain objects placed at locations corresponding to the allocated areas and based on height parameters.

19 Claims, 16 Drawing Sheets

| SEA AREA | SPECIAL TERRAIN | DEPTH | TERRAIN OBJECT THAT CAN BE ALLOCATED |
|---|---|---|---|
| CORAL REEF | | 0~-10m | CORAL A, CORAL B, CORAL C |
| OCEAN | | -20~-40m | OCEAN A, OCEAN B |
| REEF AREA | | 0~-10m | REEF A, REEF B |
| FRESH WATER AREA | ◎ | 0~-10m | FRESH WATER A, FRESH WATER B |
| ICEBERG AREA | ◎ | -10m | ICEBERG A, ICEBERG B |
| ANCIENT AREA | ◎ | -30~-50m | ANCIENT |
| METROPOLIS OF THE SEA | ◎ | -20~-40m | METROPOLIS OF THE SEA |
| ⋮ | ⋮ | ⋮ | ⋮ |

(56) References Cited

FOREIGN PATENT DOCUMENTS

| | | | |
|---|---|---|---|
| JP | 2020080007 | A | 5/2020 |
| JP | 2022532059 | A | 7/2022 |
| JP | 2023071378 | A | 5/2023 |
| WO | 2005119598 | A2 | 12/2005 |

* cited by examiner

*FIG. 7*

| SEA AREA | SPECIAL TERRAIN | DEPTH | TERRAIN OBJECT THAT CAN BE ALLOCATED |
|---|---|---|---|
| CORAL REEF | | 0～-10m | CORAL A, CORAL B, CORAL C |
| OCEAN | | -20～-40m | OCEAN A, OCEAN B |
| REEF AREA | | 0～-10m | REEF A, REEF B |
| FRESH WATER AREA | ◎ | 0～-10m | FRESH WATER A, FRESH WATER B |
| ICEBERG AREA | ◎ | -10m | ICEBERG A, ICEBERG B |
| ANCIENT AREA | ◎ | -30～-50m | ANCIENT |
| METROPOLIS OF THE SEA | ◎ | -20～-40m | METROPOLIS OF THE SEA |
| ⋮ | ⋮ | ⋮ | ⋮ |

*FIG. 9*

| TERRAIN OBJECT NAME | TERRAIN DATA | DEPTH | ENVIRONMENTAL OBJECT SELECTION CONDITION |
|---|---|---|---|
| CORAL REEF TERRAIN OBJECT A | | 0∼−10m | CORAL A, CORAL B, KELP |
| CORAL REEF TERRAIN OBJECT B | | −20∼−40m | CORAL A, ANTIQUITY |
| OCEAN TERRAIN OBJECT A | | 0∼−10m | OCEAN A, ANTIQUITY |
| OCEAN TERRAIN OBJECT B | | 0∼−10m | OCEAN A, OCEAN B |
| ICEBERG TERRAIN OBJECT | | −10m | ICEBERG |
| ⋮ | ⋮ | ⋮ | ⋮ |

FIG. 13

| ENVIRONMENTAL OBJECT | DEPTH | CORRESPONDING THEM |
| --- | --- | --- |
| JAPANESE HORSE MACKEREL | -5～-30m | CORAL A, CORAL B, KELP, OCEAN A, OCEAN B |
| DUNKLEOSTEUS | -20～-50m | CORAL ANTIQUITY, OFFSHORE ANTIQUITY |
| BELUGA | 0～-30m | ICEBERG |
| ⋮ | ⋮ | ⋮ |

NON-TRANSITORY STORAGE MEDIUM HAVING STORED THEREIN INFORMATION PROCESSING PROGRAM, INFORMATION PROCESSING APPARATUS, INFORMATION PROCESSING METHOD, AND INFORMATION PROCESSING SYSTEM FOR GENERATING A VIRTUAL TERRAIN

CROSS REFERENCE TO RELATED APPLICATION

This nonprovisional application is based on Japanese Patent Application No. 2023-107743 filed with the Japan Patent Office on Jul. 30, 2023, the entire contents of which are hereby incorporated by reference.

FIELD

This disclosure relates to an information processing program, an information processing apparatus, an information processing method, and an information processing system for generating a three-dimensional virtual space including a terrain.

BACKGROUND AND SUMMARY

There are known systems that perform information processing, such as games, in a three-dimensional virtual space including terrain. The three-dimensional virtual space is either prepared in advance or generated by an information processing system (e.g., JPA No. 2023-071378).

The purpose of this disclosure is to provide a non-transitory storage medium having stored therein a novel information processing program, a novel information processing apparatus, a novel information processing method, and a novel information processing system for generating a three-dimensional virtual space including terrain.

A non-transitory storage medium has stored therein an information processing program of configuration 1 for generating a virtual terrain. The information processing program causes a computer to function as: a terrain object allocating section configured to allocate a terrain object automatically selected from a plurality of terrain object candidates as a selected terrain object to each of a plurality of areas segmented in a planar direction in a three-dimensional virtual space; a height parameter determining section configured to automatically determine a height parameter indicating a height position in the three-dimensional virtual space for each of a plurality of the selected terrain objects; and a terrain generating section configured to generate the virtual terrain including the selected terrain object placed at a position which is based on the height parameter and is corresponding to the area to which the selected terrain is allocated.

With this configuration, the terrain object to be allocate at each position in the three-dimensional virtual space is selected from a plurality of terrain object candidates prepared in advance, eliminating the need to generate a terrain object each time and reducing the processing load. In addition, since the positions of the selected terrain object is determined not only in the plane direction of the three-dimensional virtual space but also in the height direction, it is possible to generate many combinations of virtual terrain.

In the non-transitory storage medium having stored therein the information processing program of configuration 2 according to the configuration 1, the information processing program further causes the computer to function as an area information assigning section configured to assign area information selected from a plurality of pieces of area information to each of the plurality of areas segmented in the planar direction in the three-dimensional virtual space.

With this configuration, since area information selected from the plurality of pieces of area information is assigned to each of a plurality of areas segmented in the plane direction in the three-dimensional virtual space, different area information can be assigned to each area in the three-dimensional virtual space. The area information may be, for example, a sea area.

In the non-transitory storage medium having stored therein the information processing program of configuration 3 according to the configuration 2, the terrain object allocating section is configured to allocate to each of the plurality of areas the selected terrain object from the plurality of terrain object candidates corresponding to the area information assigned to the area.

With this configuration, a terrain object corresponding to the assigned area information is selected for each area. When the area information is a sea area, a terrain object corresponding to the assigned sea area is selected for each area.

In the non-transitory storage medium having stored therein information processing program of configuration 4 according to any of the configurations 1 to 3, the height parameter determining section is configured to determine the height parameter within the range of parameters that is mapped in advance to the selected terrain object.

With this configuration, it is possible to determine the height of each terrain object within a predetermined range.

In the non-transitory storage medium having stored therein information processing program of configuration 5 according to any of the configurations 1 to 4, the information processing program further causes the computer to function as an environmental object arranging section configured to arrange one or more environmental objects corresponding to the selected terrain object in association with the selected terrain object.

With this configuration, it is possible to generate a three-dimensional virtual space that includes not only terrain objects but also environmental objects.

In the non-transitory storage medium having stored therein information processing program of configuration 6 according to the configuration 5, the environmental object arranging section is configured to arrange an environmental object based on at least one piece of theme information automatically selected based on a environmental object selection condition out of a plurality of theme information to be associated with the selected terrain object.

With this configuration, it is possible to arrange an environmental object corresponding to a theme associated with the selected terrain object.

In the non-transitory storage medium having stored therein information processing program of configuration 7 according to the configuration 6, the environmental object selection condition includes a condition for the position of the selected terrain object determined by the height parameter determining section.

With this configuration, it is possible to arrange an environmental object according to the height of terrain objects.

In the non-transitory storage medium having stored therein information processing program of configuration 8 according to any of the configurations 1 to 7, the three-dimensional virtual space is divided into a plurality of unit areas in the planar direction. The terrain object has a size corresponding to one or more of the unit areas.

With this configuration, it is possible to allocate multiple terrain objects without gaps.

In the non-transitory storage medium having stored therein information processing program of configuration 9 according to the configuration 8, the terrain object has a portion protruding from the corresponding one or more of the plurality of areas, and has a shape that can constitute a terrain surface on the side of the protruding portion, and the terrain generating section causes the plurality of selected terrain objects adjacent to each other to be allocate so that the portion protruding from the unit area overlaps with each other.

With this configuration, it is possible for boundaries between the selected terrain objects adjacent to each other to have a natural shape.

In the non-transitory storage medium having stored therein information processing program of configuration 10 according to the configurations 1 to 9, the generation of the terrain is performed when the game is started for the first time in offline play, when the three-dimensional virtual space is updated under predetermined conditions in offline play, or when a session is created in online play.

With this configuration, it is possible to generate the three-dimensional virtual space for each session, for each game, or for each update under predetermined conditions.

In the non-transitory storage medium having stored therein information processing program of configuration 11 according to any of the configurations 1 to 10, the terrain object allocating section further specifies a rotation angle in the plane direction for the selected terrain object.

With this configuration it is possible to improve the randomness of the generated three-dimensional virtual space.

In the non-transitory storage medium having stored therein information processing program of configuration 12 according to any of the configurations 1 to 11, the terrain object is a three-dimensional object.

With this configuration, it is possible to generate a three-dimensional terrain.

In the non-transitory storage medium having stored therein information processing program of configuration 13 according to the configuration 12, the terrain object has a lateral hole portion.

With this configuration, a lateral hole that can be penetrated is provided in the three-dimensional virtual space.

In the non-transitory storage medium having stored therein information processing program of configuration 14 according to any of the configurations 1 to 13, the terrain object is classified as either a terrain object of the first type or a terrain object of the second type.

With this configuration, it is possible to select a terrain objects from two types of terrain objects.

In the non-transitory storage medium having stored therein information processing program of configuration 15 according to any of the configurations 1 to 14, the information processing program further functions as a game process executing section configured to execute game processes using the virtual terrain generated by the terrain generating section.

With this configuration, it is possible to execute a game using the generated three-dimensional virtual space.

An information processing apparatus of configuration 16 is an information processing apparatus for generating virtual terrain, comprising: a terrain object allocating section configured to allocate a terrain object automatically selected from a plurality of terrain object candidates as a selected terrain object to each of a plurality of areas segmented in a planar direction in a three-dimensional virtual space; a height parameter determining section configured to automatically determine a height parameter indicating a height position in the three-dimensional virtual space for each of a plurality of the selected terrain objects; and a terrain generating section configured to generate the virtual terrain including the selected terrain object placed at a position which is based on the height parameter and is corresponding to the area to which the selected terrain is allocated.

With this configuration, the terrain object to be allocate at each position in the three-dimensional virtual space is selected from a plurality of terrain object candidates prepared in advance, eliminating the need to generate a terrain object each time and reducing the processing load. In addition, since the positions of the selected terrain object is determined not only in the plane direction of the three-dimensional virtual space but also in the height direction, it is possible to generate many combinations of virtual terrain.

The information processing method of configuration 17 is an information processing method for generating virtual terrain comprises: a terrain object allocating step configured to allocate a terrain object automatically selected from a plurality of terrain object candidates as a selected terrain object to each of a plurality of areas segmented in a planar direction in a three-dimensional virtual space; a height parameter determining step configured to automatically determine a height parameter indicating a height position in the three-dimensional virtual space for each of a plurality of the selected terrain objects; and a terrain generating step configured to generate the virtual terrain including the selected terrain object placed at a position which is based on the height parameter and is corresponding to the area to which the selected terrain is allocated.

With this configuration, the terrain object to be allocate at each position in the three-dimensional virtual space is selected from a plurality of terrain object candidates prepared in advance, eliminating the need to generate a terrain object each time and reducing the processing load. In addition, since the positions of the selected terrain object is determined not only in the plane direction of the three-dimensional virtual space but also in the height direction, it is possible to generate many combinations of virtual terrain.

The information processing method of configuration 18 according to the configuration 17 further comprises an area information assignment step configured to assign area information selected from a plurality of pieces of area information to each of the plurality of areas segmented in the planar direction in the three-dimensional virtual space.

With this configuration, since area information selected from the plurality of pieces of area information is assigned to each of a plurality of areas segmented in the plane direction in the three-dimensional virtual space, different area information can be assigned to each area in the three-dimensional virtual space. The area information may be, for example, a sea area.

In the information processing method of configuration 19 according to the configuration 18, the terrain object allocating step is configured to allocate to each of the plurality of areas the selected terrain object from the plurality of terrain object candidates corresponding to the area information assigned to the area.

With this configuration, a terrain object corresponding to the assigned area information is selected for each area. When the area information is a sea area, a terrain object corresponding to the assigned sea area is selected for each area.

The information processing system of configuration 20 is an information processing system for generating virtual terrain comprises: a terrain object allocating section configured to allocate a terrain object automatically selected from a plurality of terrain object candidates as a selected terrain object to each of a plurality of areas segmented in a planar direction in a three-dimensional virtual space; a height parameter determining section configured to automatically determine a height parameter indicating a height position in the three-dimensional virtual space for each of a plurality of the selected terrain objects; and a terrain generating section configured to generate the virtual terrain including the selected terrain object placed at a position which is based on the height parameter and is corresponding to the area to which the selected terrain is allocated.

With this configuration, the terrain object to be allocate at each position in the three-dimensional virtual space is selected from a plurality of terrain object candidates prepared in advance, eliminating the need to generate a terrain object each time and reducing the processing load. In addition, since the positions of the selected terrain object is determined not only in the plane direction of the three-dimensional virtual space but also in the height direction, it is possible to generate many combinations of virtual terrain.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 7 shows an example of information stored in an area information storage section of the embodiment;

FIG. 9 shows an example of information stored in a terrain object storage section of the embodiment;

FIG. 13 shows examples of environmental objects stored in an environmental object storage section of the embodiment;

DETAILED DESCRIPTION OF NON-LIMITING EXAMPLE EMBODIMENTS

Example embodiments of the non-transitory storage medium having stored therein the information processing program, the information processing apparatus, the information processing method, and the information processing system will be described with reference to the drawings below. The embodiments described below are examples of cases in which the invention is implemented, and are not limited to the specific configuration described below. In implementing the invention, specific configurations according to the embodiments may be adopted as appropriate.

Figure 1:
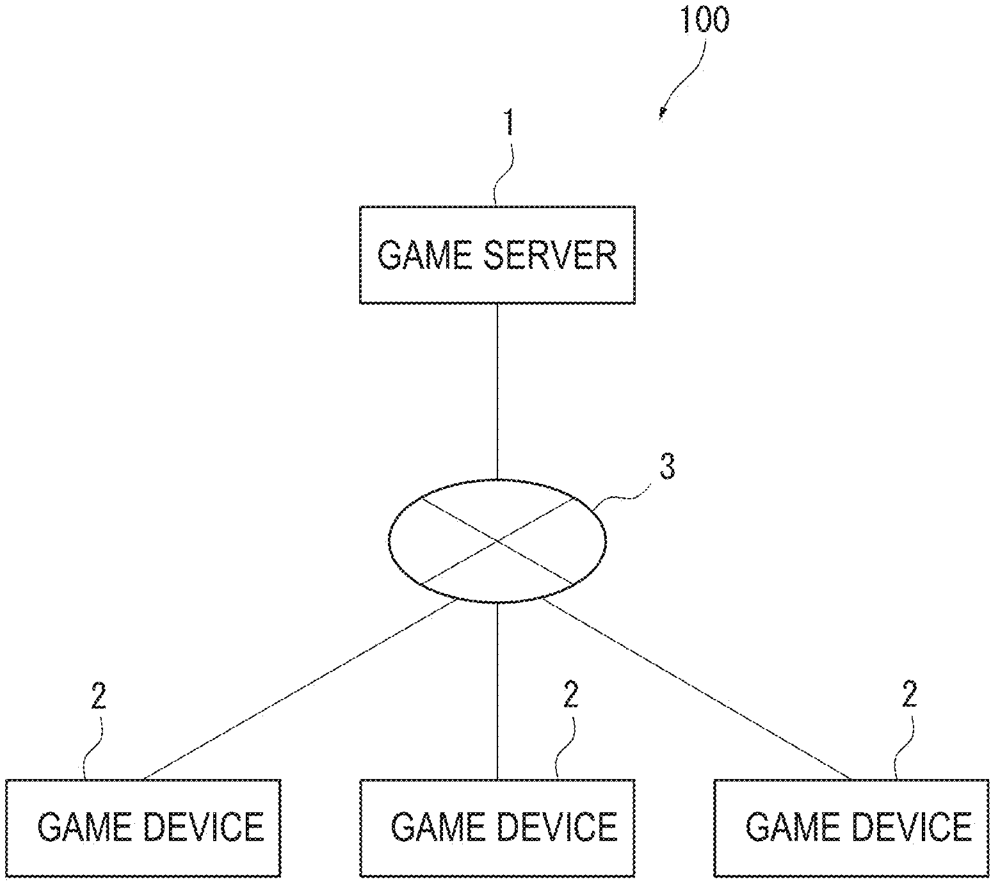
FIG. 1 is a schematic diagram of the overall picture of the information processing system of an embodiment.

FIG. 1 is a schematic diagram showing the overall image of the information processing system of the embodiment of the present disclosure. The information processing system 100 includes a server 1 and a plurality of information processing devices 2. In this embodiment, the information processing system 100 is applied as a game system, where the server 1 is a game server and the information processing devices 2 are game devices. The information processing device as the game device 2 may be a dedicated game device or may comprise a general-purpose information processing device such as a smartphone, stationary or portable game device, tablet terminal, cell phone, personal computer, wearable terminal, etc. executing a game program. The game server 1 and the game device 2 are configured to communicate with each other via a network 3 such as the Internet. In the following embodiments, a person who uses the information processing system, i.e., a person who plays a game, is called a user, and a character operated by a user in a game is called a player or a player character.

[Hardware Configuration of the Game Server]

Figure 2:
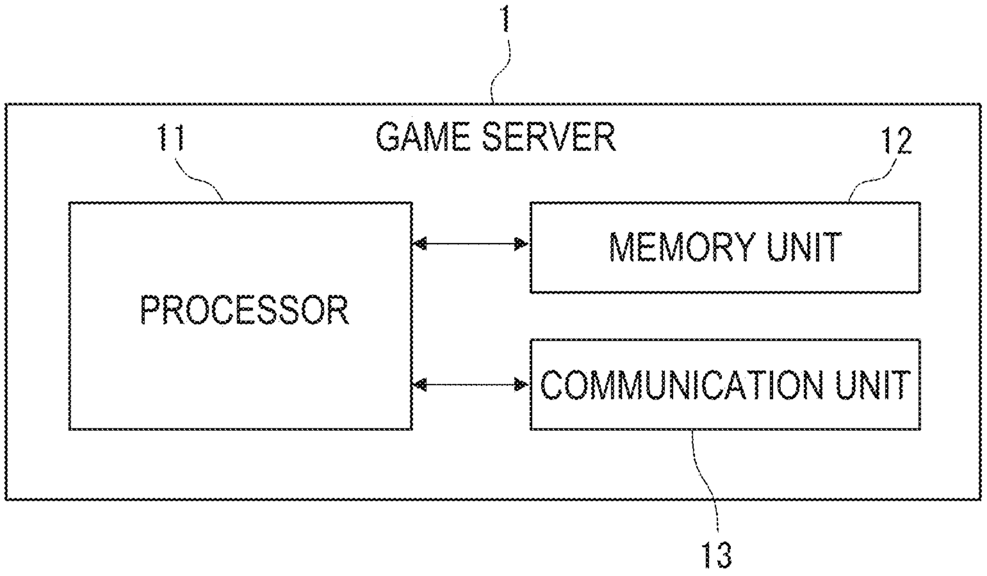
FIG. 2 is a block diagram showing a hardware configuration of a game server of the embodiment.

FIG. 2 is a block diagram of the hardware configuration of the game server. The game server 1 has at least a processor 11, a memory unit 12, and a communication unit 13. The processor 11 executes various programs to control the game server 1. The memory unit 12 stores various programs executed by the processor 11 and various data used by the processor 11. The communication unit 13 connects to the network 3 by wired or wireless communication and transmits and receives predetermined data to and from the game device 2 or other servers (not shown).

[Hardware Configuration of a Game Device]

Figure 3:
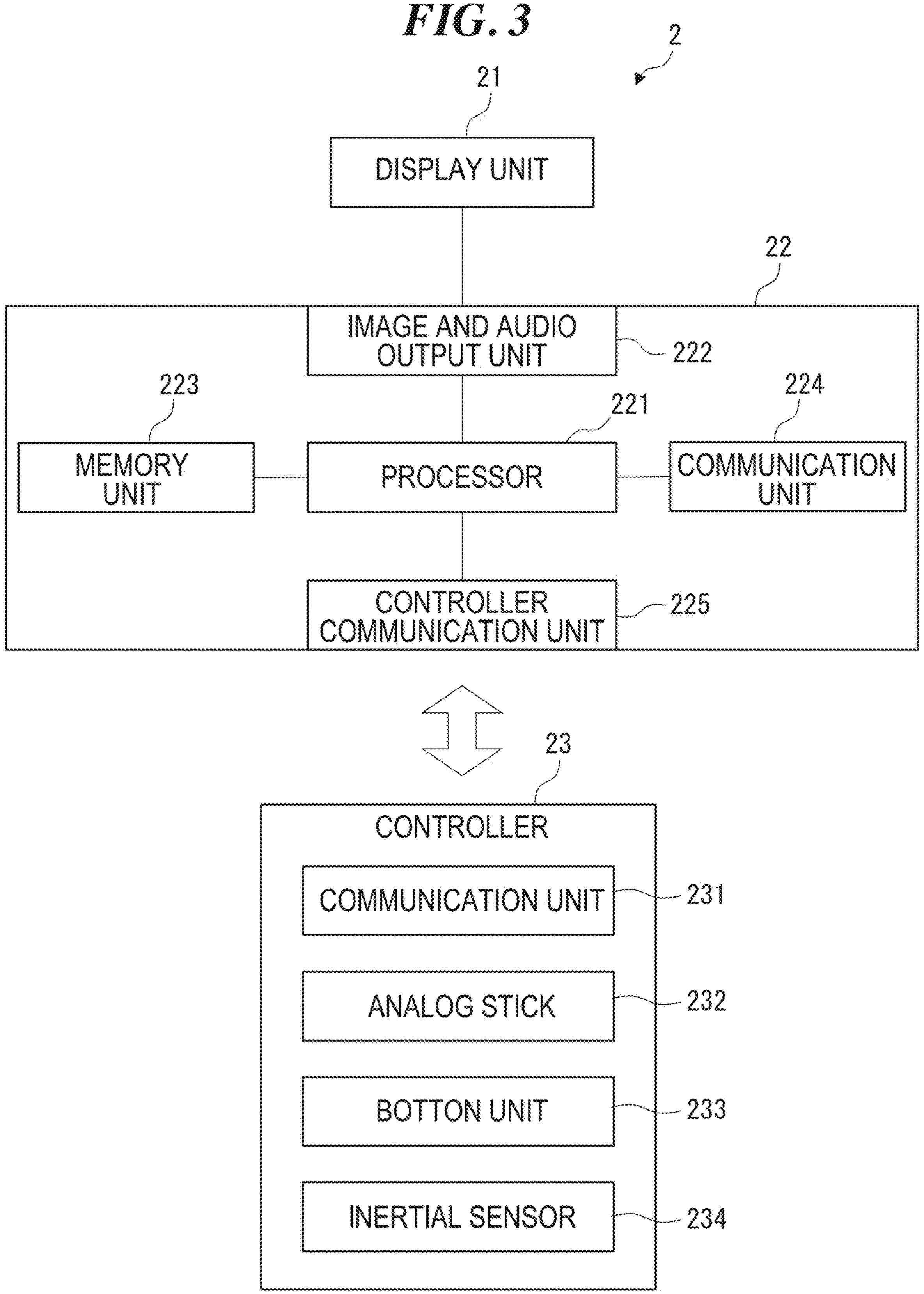
FIG. 3 is a block diagram showing an example of the hardware configuration of a game device of the embodiment.

FIG. 3 is a block diagram showing an example of the hardware configuration of the game device. The game device 2 is equipped with a display unit 21, a main unit 22, and a controller 23. The display unit 21, the main unit 22, and the controller 23 may be integrally configured, or they may be wired or wirelessly connected to each other.

The display unit 21 is a device in which a plurality of pixels are arranged two-dimensionally and displayed based on video signals. The display unit 21 also has a function to output audio based on audio signals. The display unit 21 may be a display panel and speaker integrated with the main unit 22, or it may be a monitor device with a speaker (e.g., a TV receiver) that is connected to the main unit 22 by a wire and receives and displays video signals from the main unit 22.

The main unit 22 is equipped with a processor 221, an image and audio output unit 222, a memory unit 223, a wireless communication unit 224, and a controller communication unit 225. The memory unit 223 stores various programs executed by the processor 221 and various data used by the processor 221. The memory 223 may be an internal storage medium, such as flash memory or dynamic random access memory (DRAM), for example, or may be configured to use an external storage medium or the like that is attached to a slot not shown.

The processor 221 is an information processing unit that executes various types of information processing performed in the main unit 22, and may, for example, consist of only a central processing unit (CPU), or it may consist of a system-on-a-chip (SoC) that includes multiple functions such as CPU functions, graphics processing unit (GPU) functions, and so on. The processor 221 executes the information processing program (in this embodiment, a game program) stored in the memory 223 to perform various types of information processing.

The wireless communication unit 224 allows the game device 2 to perform wireless communication with other main units 22 and predetermined server devices. For example, Internet communication and short-range wireless communication are used for the wireless communication. The controller communication unit 225 performs wired or wireless communication with the controller 23 by the main unit 22. The image and audio output unit 222 outputs the video and audio signals generated by the processor 221 to the display unit 5.

The controller 23 has a vertically shaped housing, which can be grasped in an orientation that is vertical. The housing is shaped and sized so that it can be grasped with one hand when grasped in a vertical orientation.

The controller 23 is equipped with at least one analog stick 232, which is an example of a direction input device. The analog stick 232 can be used as a direction input portion capable of inputting directions. By tilting the analog stick 232, the user can input the direction according to the direction of tilt (and the magnitude according to the angle of tilt). The controller 23 is also equipped with a button unit 233 that includes various operation buttons. For example, the controller 23 may have a plurality of operation buttons on the main surface of the housing described above. The operation buttons are, for example, A, B, X, Y buttons, a plus button, a minus button, an L button, an R button, etc.

The controller 23 is also equipped with an inertial sensor 234. Specifically, the controller 23 is equipped with an acceleration sensor and an angular rate sensor as the inertial sensor 234. In this system, the acceleration sensor detects the magnitude of acceleration along three predetermined axial directions. The angular rate sensor detects the angular rate around the predetermined three axes.

The controller 23 is also equipped with a communication unit 231 for wired or wireless communication with the above controller communication unit 234. Directional input content to the above analog stick 232, information indicating the state of pressing the button unit 233, and various detection results by the inertial sensor 234 are repeatedly output to the communication unit 231 at appropriate timing and transmitted to the main unit 22.

[Overview of the Game]

Next, the game processing to be performed in this embodiment will be explained. First, an overview of the game assumed in this embodiment is described. The game assumed in this embodiment is a game in which the player character explores a three-dimensional virtual space under the sea surface (hereinafter referred to as "virtual underwater space"). In particular, in the game in this embodiment, the virtual undersea space to be explored is automatically and randomly generated each time the player plays the game.

The game may award points to players for completing predetermined missions in the process of exploring the virtual underwater space, and rank players according to the points earned, or, players may simply explore the generated virtual underwater space without setting a specific objective and record the log of the exploration in the game.

In this embodiment, players can participate in a game by joining a session set up by the game server 1. In a session, players of multiple game devices 2 connected online to the game server 1 can explore the same virtual underwater space at the same time. In this case, the game server 1 generates the virtual underwater space for each session. Instead of or in addition to this, a player may be able to play a game in which he/she explores the virtual undersea space generated for that player alone. In this case, the game device 2 may be offline, and the virtual undersea space may be generated on the player's game device 2.

Figure 4:
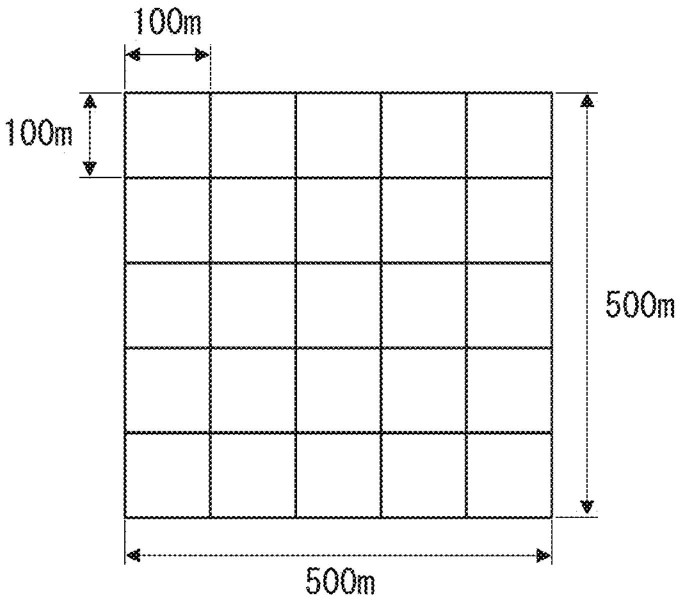
FIG. 4 shows a map for generating a virtual underwater space of the embodiment.

FIG. 4 shows a map for generating virtual terrain of the embodiment. The virtual terrain is generated by allocating terrain objects and arranging environmental objects on a 500 m×500 m sized map spread in the plane direction. The map is divided into multiple unit areas of 100 m×100 m in size in the planar direction. To generate the virtual terrain, three-dimensional terrain objects are allocated throughout the map. The environmental objects consisting of plants, organisms, and other objects are then placed on the terrain objects. In this way, virtual terrain is generated by allocating terrain objects and arranging environmental objects on a 500 m×500 m map.

[Configuration of the Game System]

Figure 5:
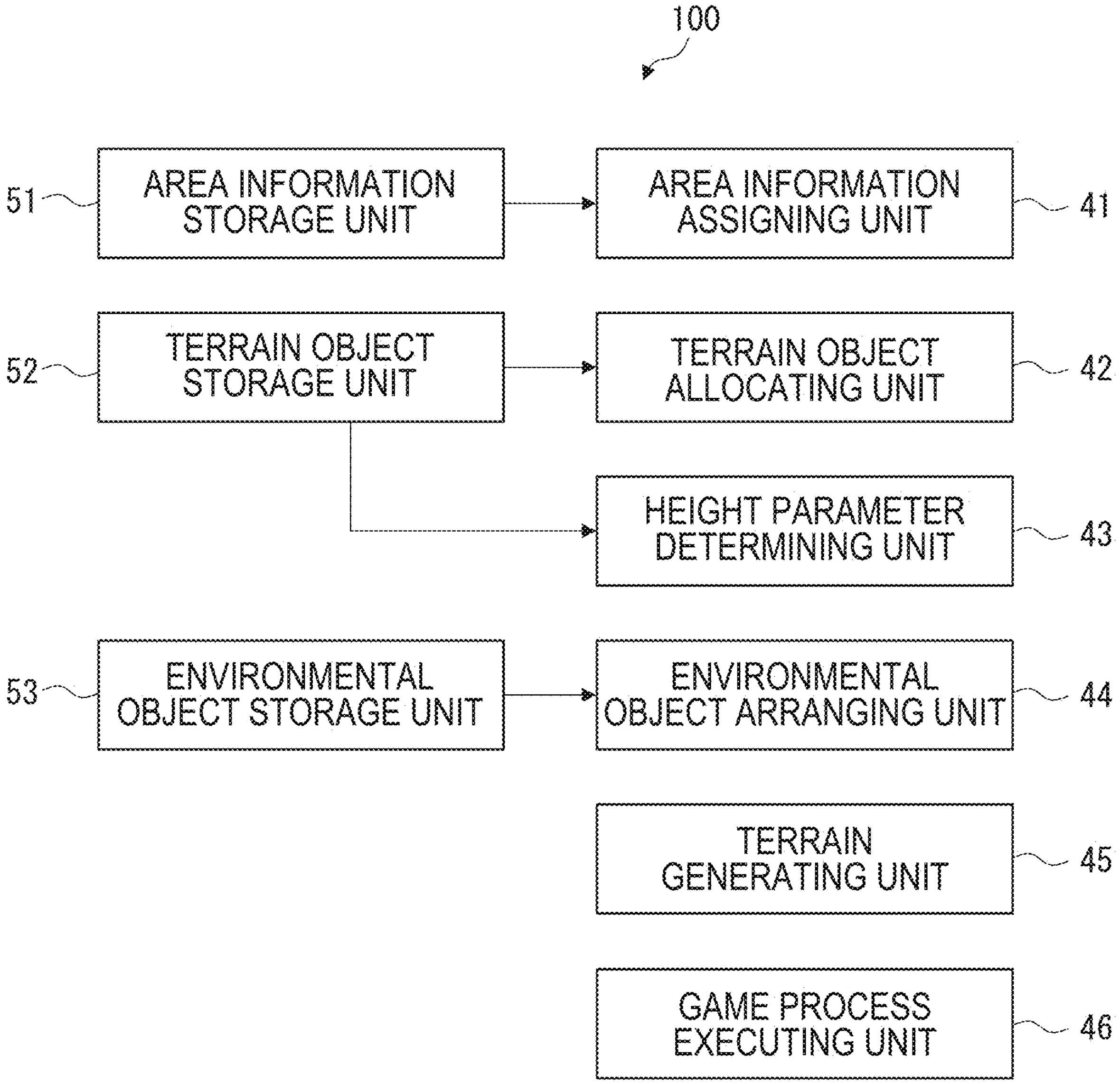
FIG. 5 is a block diagram showing a functional configuration of the game system of the embodiment.

FIG. 5 is a block diagram showing the functional configuration of the game system. The game system 100 has an area information assigning unit 41, a terrain object allocation unit 42, a height parameter determining unit 43, an environmental object arranging unit 44, a terrain generating unit 45, and a game process executing unit 46. For the processing of each of these units, the game system 100 is also equipped with an area information storage unit 51, a terrain object storage unit 52, and an environmental object storage unit 53.

In this system, it is assumed that virtual terrain is generated in a session in which multiple people can participate, and the above configuration is implemented in the game server 1. Specifically, the area information assigning unit 41, terrain object allocating unit 42, height parameter determining unit 43, environmental object arranging unit 44, terrain generating unit 45, and game process executing unit 46 are configured by the processor 11 of the game server 1 executing the game program as the information processing program of the embodiment. The area information storage unit 51, terrain object storage unit 52, and environmental object storage unit 53 are configured in the memory unit 12. The game process executing unit is also configured in each of the plurality of game devices 2, and the game is executed by linking the plurality of game process executing units of these plurality of game devices 2 and the game process executing unit 46 of the game server 1.

Some or all of the configurations in FIG. 5 may be implemented in each of the game devices 2. In this case, the virtual terrain of the session may be generated in the game device 2 of the user creating the session, which may be provided to the game server 1 and used by multiple users participating in the session. The configuration of FIG. 5 may also be implemented in the game device 2 in order for a user to play a game offline alone on the game device 2 without connecting the game device 2 to the game server 1. Furthermore, part of the configuration of FIG. 5 may be implemented in the game device 2 and the other part may be implemented in the game server 1.

[Generation Process of Virtual Underwater Space]

Figure 6:
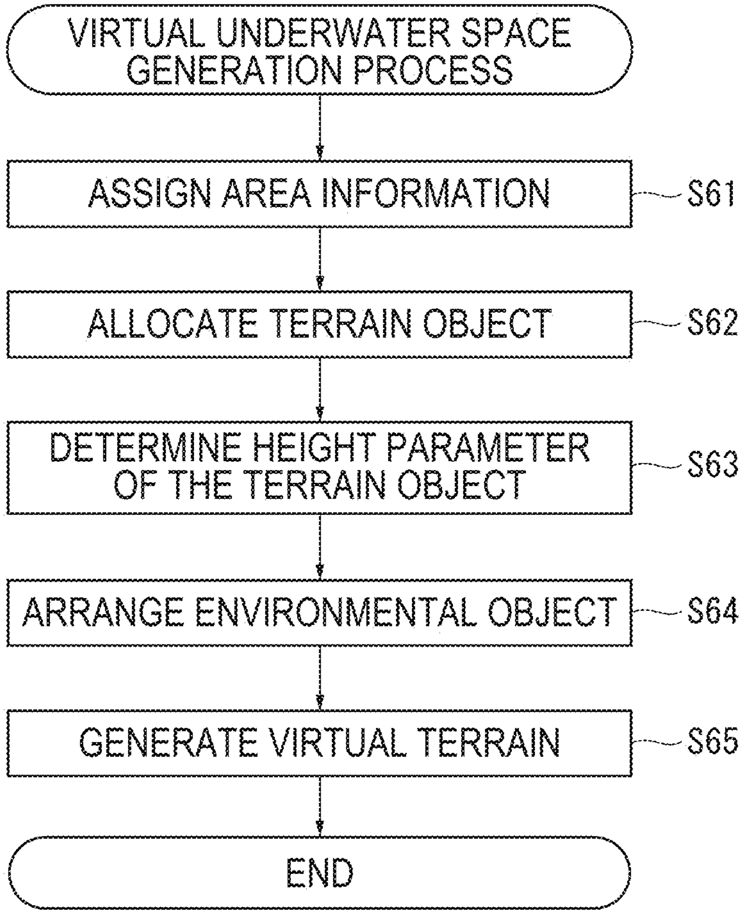
FIG. 6 is a flowchart of a process of generating the virtual underwater space of the embodiment.

FIG. 6 is a flowchart of the virtual underwater space generation process. In this process, virtual terrain consisting of terrain objects and environmental objects is generated. This generation process is executed when the game is started for the first time in offline play, when the virtual underwater space is updated under certain conditions in offline play, and when a session is created in online play.

When the process starts, first, the area information assigning unit 41 assigns area information selected from the plurality of area information to each of the plurality of areas segmented in the planar direction from the virtual underwater space (step S61). This assignment of area information is performed automatically and randomly, without instructions from the user. Next, the terrain object allocation unit 42 selects a terrain object from the multiple terrain object candidates for each of the multiple areas segmented in the planar direction in the virtual underwater space, and allocates the selected terrain object as the selected terrain object (step S62). This allocation of terrain objects is also performed automatically and randomly, without instructions from the user.

Then, the height parameter determining unit 43 automatically determines the height parameter indicating the position in the height direction in the virtual underwater space for each of the plurality of selected terrain objects (step S63). This determination of the height parameter is also performed automatically and randomly, without instructions from the user.

The environmental object arranging unit 44 arranges environmental objects corresponding to the selected terrain object in association with the selected terrain object (step S64). This environmental object is also automatically and randomly selected and arranged without instructions from the user. The terrain generator 45 generates a virtual terrain including the selected terrain object allocate at a position corresponding to the assigned area and based on the height parameter described above (step S65). The following is a detailed description of the processing of each unit.

FIG. 7 shows an example of information stored in the area information storage unit. In the area information storage unit 51, a plurality of candidate sea areas that can be selected are stored as area information. Each sea area is stored with information associated with whether it is a special terrain, depth, and information on terrain objects that can be allocated. In this system, "coral reef," "open sea," "reef sea," "fresh water area," "iceberg area," "ancient water area," and "underwater city" are stored as sea areas.

For each unit area of the map, the area information assigning unit 41 assigns a sea area selected by drawing lots from among the sea areas stored in the area information storage unit 51. This determines the sea area for each 100 m×100 m unit area in the 500 m×500 m map. At this time, by ensuring that sea areas of the same type are contiguous to a certain degree, it is possible to prevent the sea areas from becoming extremely uneven and the sea area type from changing frequently for each 100 m×100 m unit area. The sea areas may be assigned so that one sea area is surrounded by other sea areas.

Figure 8:
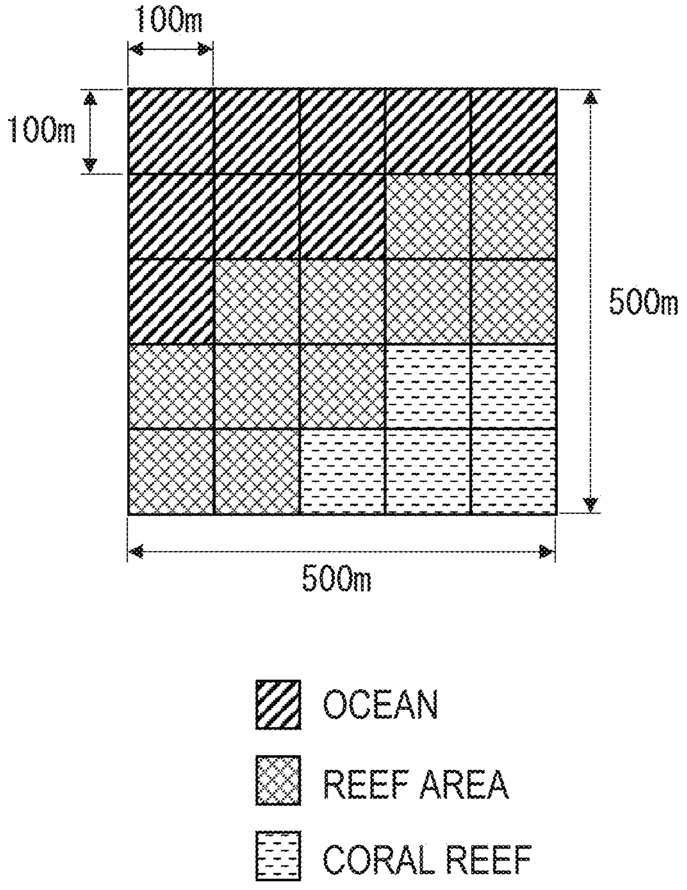
FIG. 8 shows an example of an assignment of area information by an area information assigning section of the embodiment.

FIG. 8 shows an example of the assignment of area information by the area information assigning unit. In the example in FIG. 8, underwater cities, the open ocean, rocky reef sea areas, and coral reefs are assigned to 5×5 unit areas.

FIG. 9 shows an example of information stored in the terrain object storage unit. In the terrain object storage unit 52, terrain data of terrain objects are stored in association with terrain names, depths, and environmental object selection conditions. The environmental object selection conditions are thematic information applicable to each terrain object, i.e., object placement patterns. These environmental object selection conditions may include conditions related to the location of the selected terrain object determined by the height parameter determining unit 43 described below.

Figure 10:
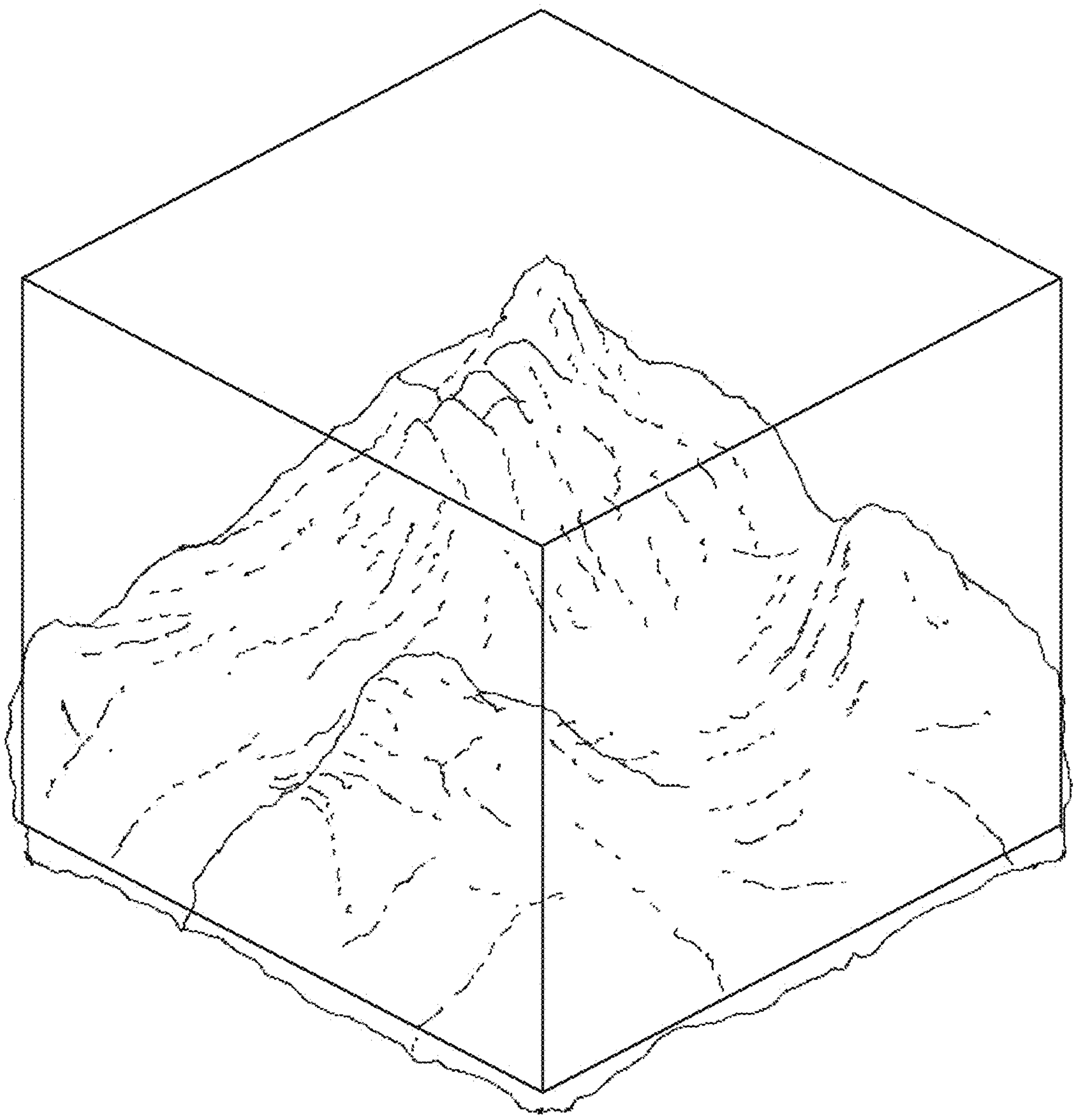
FIG. 10 shows an example of an terrain data of the embodiment.
Figure 11:
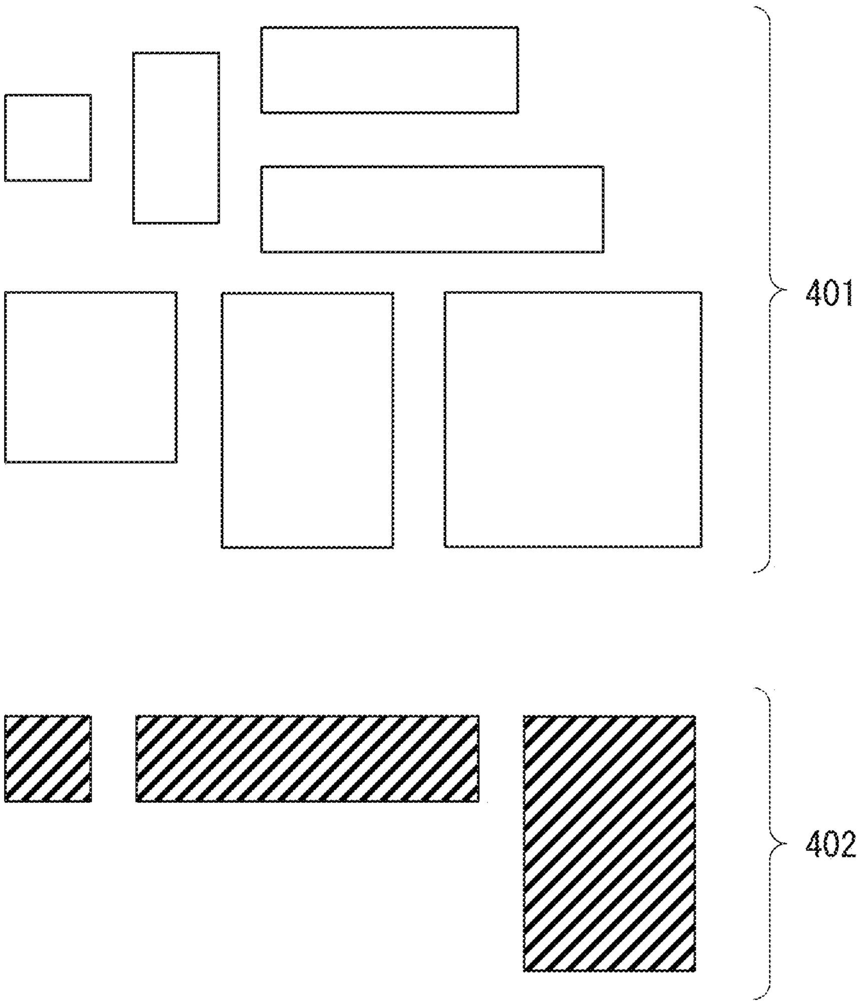
FIG. 11 shows an example of the size of the terrain data of the embodiment.

FIG. 10 shows an example of the terrain data of the form of the invention, and FIG. 11 shows an example of the size of the terrain data of the form of the invention. A terrain object is a three-dimensional (three-dimensional) object composed of polygon data. As an example, as shown in FIG. 11, each terrain object has a size corresponding to one or more 100 m×100 m unit areas. In other words, each terrain object has a size corresponding to an integer multiple of this minimum unit, with 100 m×100 m as the minimum unit.

The terrain object has terrain ridges, caves, rocky areas, etc. The terrain object may have a lateral hole portion formed. The lateral hole may be located above the sea surface or underwater depending on the height of the sea surface, i.e., the height of the terrain object. When the hole is underwater, the player character can swim through the hole.

A plurality of terrain objects may differ from each other not only in size in the planar direction but also in size in the depth direction (height). The terrain objects themselves may have a certain amount of height to create a significantly deeper portion (deep water portion) within the objects. As described below, the height parameter is determined for the selected terrain object, but if a deep sea is realized by reducing this height parameter, the boundary with the neighboring selected terrain object may not be continuous, however, by increasing the height of the terrain object itself, the deep-sea portion can be realized while maintaining continuity with the neighboring selected terrain object.

As shown in FIG. 11, the terrain objects are classified into normal terrain (type 1) 401 and special terrain (type 2) 402. In the terrain object storage unit 52, terrain objects of various sizes, with 100 m×100 m as the minimum unit, are stored for each of normal terrain and special terrain. As shown in FIG. 10, each terrain object has a portion that extends beyond one or more unit areas. Each terrain object also has a shape that can constitute a terrain surface on the side of the protruding portion.

The terrain object allocating unit 42 automatically selects a plurality of terrain objects as elected terrain objects from a plurality of candidate terrain objects stored in the terrain object storage unit 52, specifying the position in the plane direction of the virtual underwater space. In this case, the terrain objects may be rotatable in 90-degree increments around a vertical axis, in which case the terrain object allocating unit 42 also specifies the rotation angle of the selected terrain objects.

Figure 12:
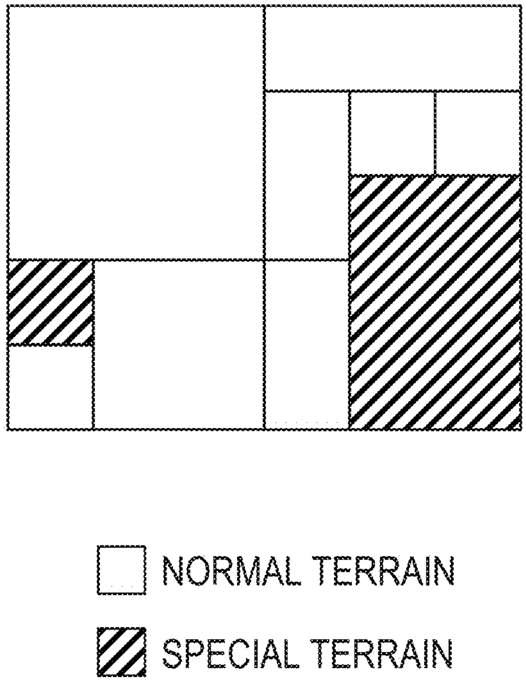
FIG. 12 shows an example of a plurality of selected terrain objects selected by specifying their locations through the terrain object selection section of the embodiment.

FIG. 12 shows an example of a plurality of selected terrain objects selected by the terrain object selecting unit in this embodiment by specifying their positions. As described above, each area is assigned a sea area by the area information assigning unit 41, so the terrain object allocating unit 42 selects, for each area, a terrain object to be allocated to that area from a plurality of candidates of allocatable terrain objects (see FIG. 6) corresponding to the assigned sea area.

The terrain object allocating unit 42 may randomly select terrain objects to be allocated from among normal terrain and special terrain, or it may decide in advance by drawing lots which of normal terrain or special terrain to allocate for each area and select terrain objects according to that decision. Alternatively, the percentage or number of special terrain objects may be determined by drawing lots, and the terrain objects may be selected according to that determination. Note that since special terrain is associated with sea areas (see FIG. 7), the sea area in the area assigned to the special terrain will be overwritten by the sea area corresponding to the special terrain.

The height parameter determining unit 43 automatically determines a height parameter indicating the position in the direction of height in the virtual underwater space for each of the multiple elected terrain objects assigned to the multiple areas by the terrain object allocating unit 42. This height parameter indicates the depth at which the terrain objects are to be allocated. As shown in FIG. 8, each terrain object is allocated with a range of depths at which the terrain object can be allocated. The height parameter determining unit 43 determines the height parameter of the selected terrain object within the range of depths (height parameters) that are pre-mapped to the selected terrain object. By setting the range of the height parameter smaller than the height of the terrain object itself, continuity between adjacent selected terrain objects can be ensured.

The environmental object arranging unit 44 arranges environmental objects corresponding to each selected terrain object in association with that selected terrain object. For this arrangement of environmental objects, the environmental object arranging unit 44 determines a theme for each selected terrain object by drawing lots, and arranges environmental objects corresponding to the determined theme.

As shown in FIG. 8, each terrain object is associated with multiple selectable theme information as environmental object selection conditions. The environmental object arranging unit 44 selects at least one theme information from among the plurality of theme information that can be associated with the selected terrain object based on the environmental object selection conditions shown in FIG. 8, and selects and arranges environmental objects according to the selected theme information.

FIG. 13 shows examples of environmental objects stored in the environmental object storage unit. In the environmental object storage unit 53, environmental objects are stored with depth and corresponding themes associated with them.

When a theme is determined, the environmental object arranging unit 44 refers to the environmental object storage unit 53 to select an environmental object corresponding to that theme. Types of environmental objects include living organisms, plants, and other objects (e.g., sunken ships, whale bones, buildings, etc.). After selecting a theme, the environmental object arranging unit 44 also selects an environmental object corresponding to the height (depth) of the terrain object based on the height of the terrain object.

Figure 14:
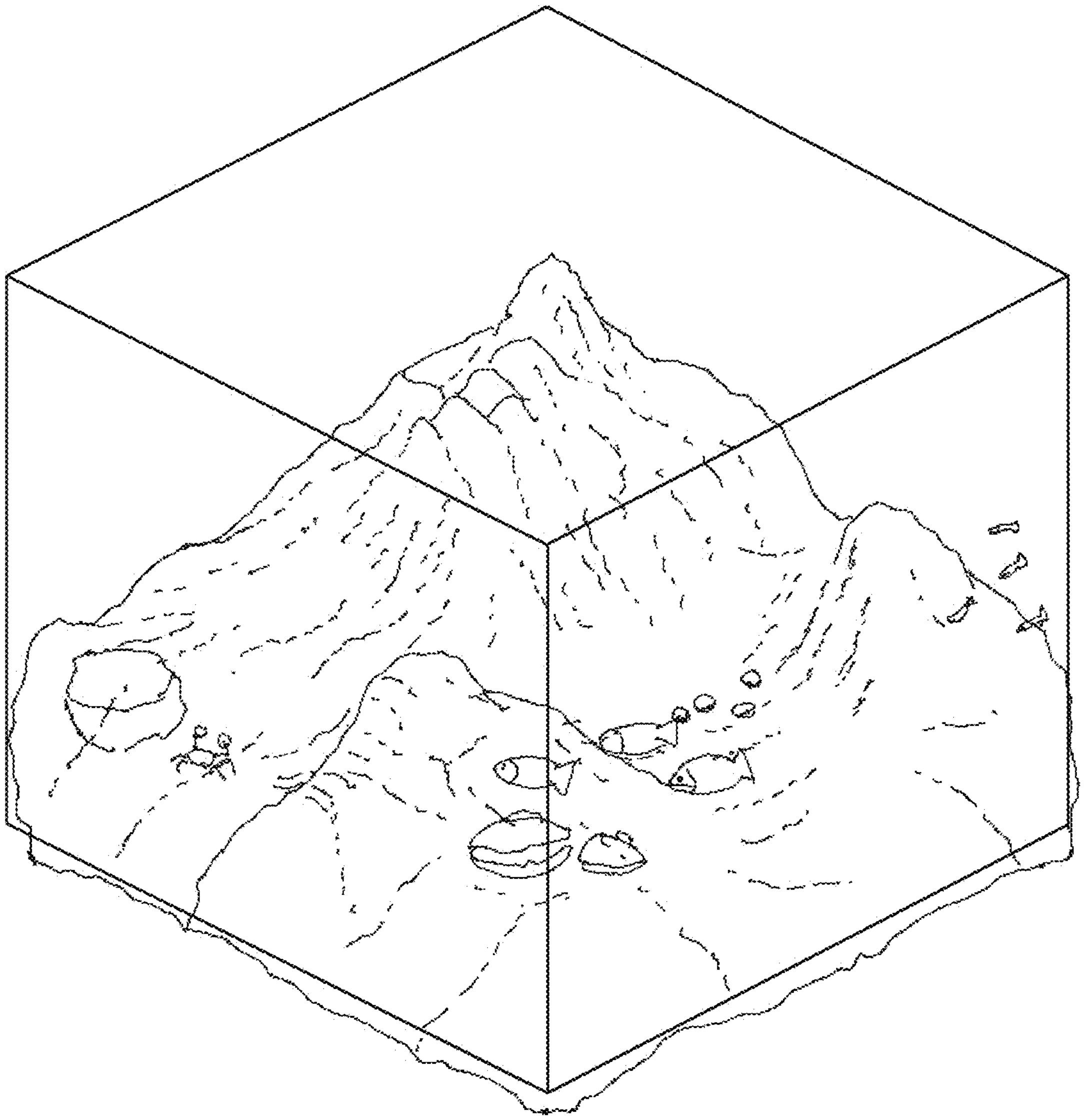
FIG. 14 shows a terrain object in which environmental objects of the embodiment are placed.

FIG. 14 shows a terrain object with environmental objects arranged on it. As shown in FIG. 14, a terrain object may have multiple environmental objects arranged on it. For organisms, which are a type of environmental object, categories of locations in which they may be allocated, routes, and behaviors may be set, and which organisms are arranged may be determined by drawing lots based on information associated with the organisms.

The locations where the organisms may be arranged may be specified by an arrangement location, or by the range or route of behavior. The behavior category may be, for example, territorial (staying in a specific range), migratory, benthic, etc. The organisms may also be enabled or disabled by specific conditions. For example, enablement and disablement may be controlled by reference to conditions in a particular area or the entire virtual underwater space, or by reference to the progress of a search or mission. Some terrain objects may also have organisms that are always arranged without being drawn.

The information associated with the organisms includes, for example, information about appearance time zone, adaptation depth, and adaptation theme. The appearance time zone may be, for example, all day, morning, noon, night, etc. Multiple time zones may be set as the appearance time zone. For the adaptation depth and adaptation theme, a specific depth range and adaptation theme may be specified, or it may be set to be adaptable to all depths and themes without any particular restrictions.

Figure 15A:
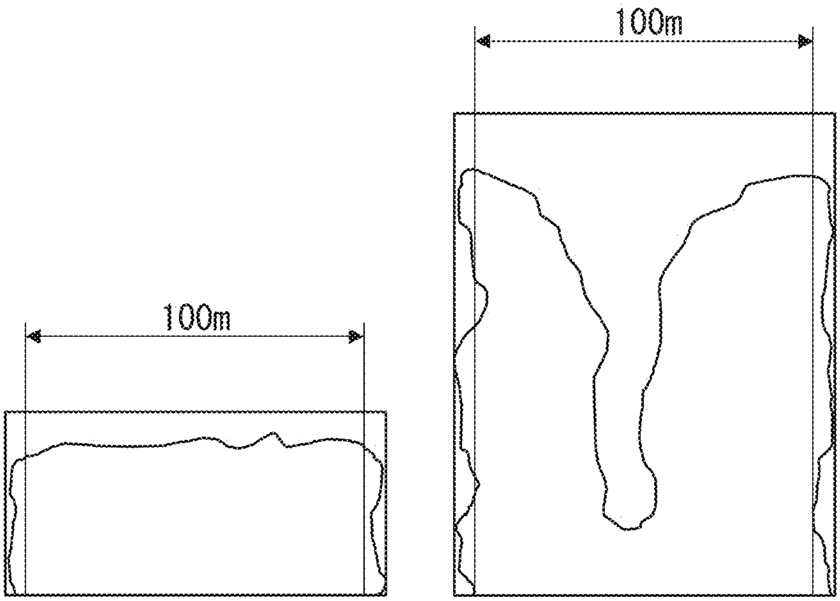
FIG. 15A shows how height parameters of selected terrain objects of the embodiment are determined and combined.
Figure 15B:
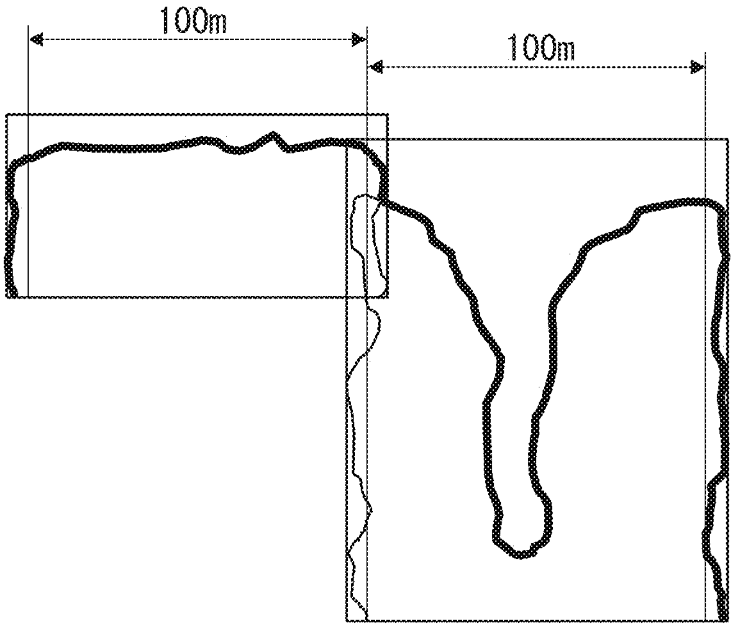
FIG. 15B shows how the height parameters of the selected terrain objects of the embodiment are determined and combined.
Figure 15C:
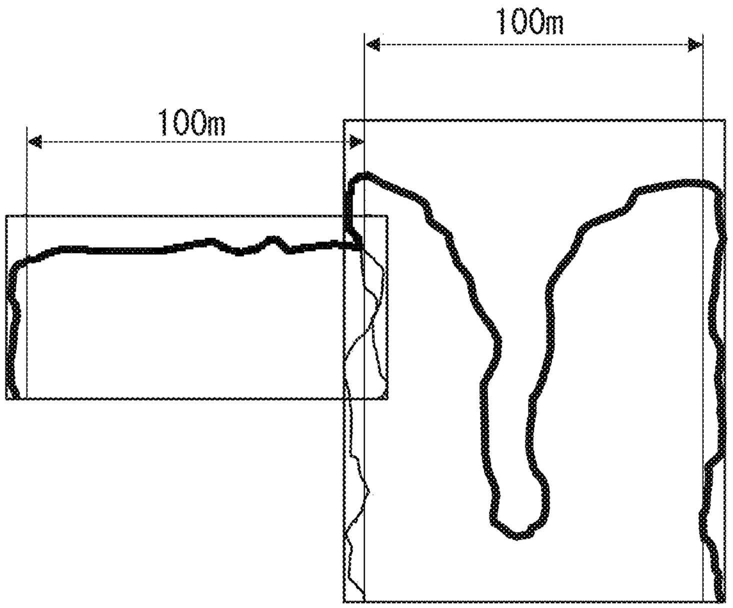
FIG. 15C shows how the height parameters of the selected terrain objects of the embodiment are determined and combined.

FIGS. 15A, 15B, and 15C illustrate how the height parameters of the selected terrain objects are determined and combined. The examples in FIGS. 15A, 15B and 15C show how two terrain objects of size 100 m×100 m are combined next to each other. FIGS. 15B and 15C show examples where the heights of the terrain objects differ from each other.

The terrain generating unit 45 places the selected terrain objects, which are allocated to areas in the virtual underwater space and for which height parameters have been determined, on the map. The terrain object has a size corresponding to the size of one or more 100 m×100 m unit areas, as described above, but has a slightly protruding portion, as shown in FIG. 15A. As mentioned above, the protruding portion also has a shape that could be a ground surface, i.e., it is not a flat surface. Adjacent terrain objects are combined in such a way that the protruding portion overlaps.

This generates the ground surface shown by the bold lines in FIGS. 15B and 15C, respectively, and the pitch of each terrain object is 100 meters. As is clear from comparing FIGS. 15B and 15C, the ground surface at the boundary of the terrain objects takes on a different shape depending on the height of the neighboring terrain objects.

The terrain generating unit 45 further arranges the environmental objects selected by the environmental object arranging unit 44 in the virtual underwater space to complete the virtual terrain.

The game process executing section 46 executes game processing using the virtual terrain generated by the terrain generating unit 45. For each player, the game process executing unit 46 executes game processing based on operation signals from the game device 2 for controlling that player. At the start of the game, the game process executing unit 46 sets the player's appearance point on each terrain object.

A maximum of 99 players can participate in one session at the same time. The game process executing unit 46 sets four appearance points per 100 m×100 m unit area. As described above, the virtual underwater space contains 25 unit areas, so 100 appearance points are set for 100 players. When a player joins a session, the game process executing unit 46 draws lots to determine which appearance point the player concerned will appear at. The game process executing unit 46 draws lots so that the appearance points do not overlap for multiple players.

As described above, according to the game system 100, virtual terrain is randomly generated for each session or each game, so that players can play games in a virtual underwater space with different virtual terrain each time. In addition, since the height of each terrain object is also determined in addition to simply combining terrain objects in the planar direction, different virtual terrain is generated depending on the height of the terrain objects, as shown in FIGS. 15B and 15C.

As described above, the sea area, terrain objects, and environmental objects (organisms, etc.) in each area of the virtual underwater space are all determined automatically and randomly by the game system 100. Here, "automatically" means that they are selected, determined, etc. without instructions from the user. The term "random" means that the selection, determination, etc. is performed randomly or arbitrarily under predetermined conditions or restrictions.

As shown in FIG. 6, in the above embodiment, for each area in the virtual underwater space, area information is assigned (step S61), terrain objects are assigned (step S62) under the constraints ("terrain objects that can be allocated" in FIG. 7) based on the assigned area information, and the height parameter is determined under the constraints ("depth" in FIG. 9) imposed by the allocated terrain object (step S63), and the environmental objects are arranged under the constraints of terrain objects and height parameters (step S64). Thus, in the above embodiment, each element of the terrain to be generated is determined step by step, and in doing so, the next step is determined under the constraints by the elements determined in the previous step.

In such a terrain generation process, the order in which each element (sea area, terrain object, height parameter, and environmental object) is determined may be in a different order than in the above embodiment. For example, after determining the sea area, the height parameter may be determined, followed by the terrain object and environmental object. In addition, the decision of the next step may not be constrained by the decision of the previous step. In this case, the processing order of this previous step and the next step may be arbitrary.

Although the above embodiment describes a game system generating virtual terrain in a virtual underwater space, the game system may instead generate virtual terrain in a three-dimensional virtual space on the ground. Although the above described embodiment shows that the information processing system is applied to a game system, the information processing system may use the generated virtual terrain for information processing other than games. For example, the virtual terrain may be generated for vehicle driving training.

The invention claimed is:

1. A non-transitory storage medium has stored therein an information processing program for generating a virtual terrain, wherein the information processing program causes a computer to:

allocate a terrain object automatically selected from a plurality of terrain object candidates as a selected terrain object to each of a plurality of areas segmented in a planar direction in a three-dimensional virtual space;

automatically determine a height parameter indicating a height position in the three-dimensional virtual space for each of a plurality of the selected terrain objects; and generate the virtual terrain including the selected terrain object placed at a position which is based on the height parameter and is corresponding to the area to which the selected terrain is allocated.

2. The non-transitory storage medium according to claim 1, wherein the information processing program further causes the computer to assign area information selected from a plurality of pieces of area information to each of the plurality of areas segmented in the planar direction in the three-dimensional virtual space.

3. The non-transitory storage medium according to claim 2, wherein the selected terrain object is allocated to each of the plurality of areas from the plurality of terrain object candidates corresponding to the area information assigned to the area.

4. The non-transitory storage medium according to claim 1, wherein the height parameter is determined to be within the range of parameters that is mapped in advance to the selected terrain object.

5. The non-transitory storage medium according to claim 1, wherein the information processing program further causes the computer to arrange one or more environmental objects corresponding to the selected terrain object in association with the selected terrain object.

6. The non-transitory storage medium according to claim 5, wherein an environmental object is arranged based on at least one piece of theme information automatically selected based on an environmental object selection condition out of a plurality of theme information to be associated with the selected terrain object.

7. The non-transitory storage medium according to claim 6, wherein the environmental object selection condition includes a condition for the position of the selected terrain.

8. The non-transitory storage medium according to claim 1, wherein at least one of the terrain objects has a shape corresponding to two or more of the plurality of areas.

9. The non-transitory storage medium according to claim 1, wherein the terrain object has a portion protruding from the corresponding one or more of the plurality of areas, and has a shape that can constitute a terrain surface on the side of the protruding portion, and wherein the plurality of selected terrain objects adjacent to each other are allocated so that the portion protruding from the area overlaps with each other.

10. The non-transitory storage medium according to claim 1, wherein the generation of the terrain is performed when a game is started for the first time in offline play, when the three-dimensional virtual space is updated under predetermined conditions in offline play, or when a session is created in online play.

11. The non-transitory storage medium according to claim 1, wherein the information processing program causes the computer to further specify a rotation angle in the plane direction for the selected terrain object.

12. The non-transitory storage medium according to claim 1, wherein the terrain object is a three-dimensional object.

13. The non-transitory storage medium according to claim 1, wherein the terrain object has a lateral hole portion.

14. The non-transitory storage medium according to claim 1, wherein the terrain object is classified as either a terrain object of the first type or a terrain object of the second type.

15. The non-transitory storage medium according to claim 1, wherein the information processing program further cause the computer to execute game processes using the virtual terrain generated.

16. An information processing method for generating virtual terrain, comprising:

allocating a terrain object automatically selected from a plurality of terrain object candidates as a selected terrain object to each of a plurality of areas segmented in a planar direction in a three-dimensional virtual space;

automatically determining a height parameter indicating a height position in the three-dimensional virtual space for each of a plurality of the selected terrain objects; and generating the virtual terrain including the selected terrain object placed at a position which is based on the height parameter and is corresponding to the area to which the selected terrain is allocated.

17. The information processing method according to claim 16, further comprising assigning area information selected from a plurality of pieces of area information to each of the plurality of areas segmented in the planar direction in the three-dimensional virtual space.

18. The information processing method according to claim 17, wherein allocate to each of the plurality of areas are allocated the selected terrain object from the plurality of terrain object candidates corresponding to the area information assigned to the area.

19. An information processing system, comprising:

a memory; and a processor configured to:

allocate a terrain object automatically selected from a plurality of terrain object candidates stored in the memory as a selected terrain object to each of a plurality of areas segmented in a planar direction in a three-dimensional virtual space;

automatically determine a height parameter indicating a height position in the three-dimensional virtual space for each of a plurality of the selected terrain objects; and generate the virtual terrain including the selected terrain object placed at a position which is based on the height parameter and is corresponding to the area to which the selected terrain is allocated.

* * * * *